June 21, 1960
P. H. DIXON
2,941,424
INDEXING MECHANISM
Filed April 1, 1958
5 Sheets-Sheet 1
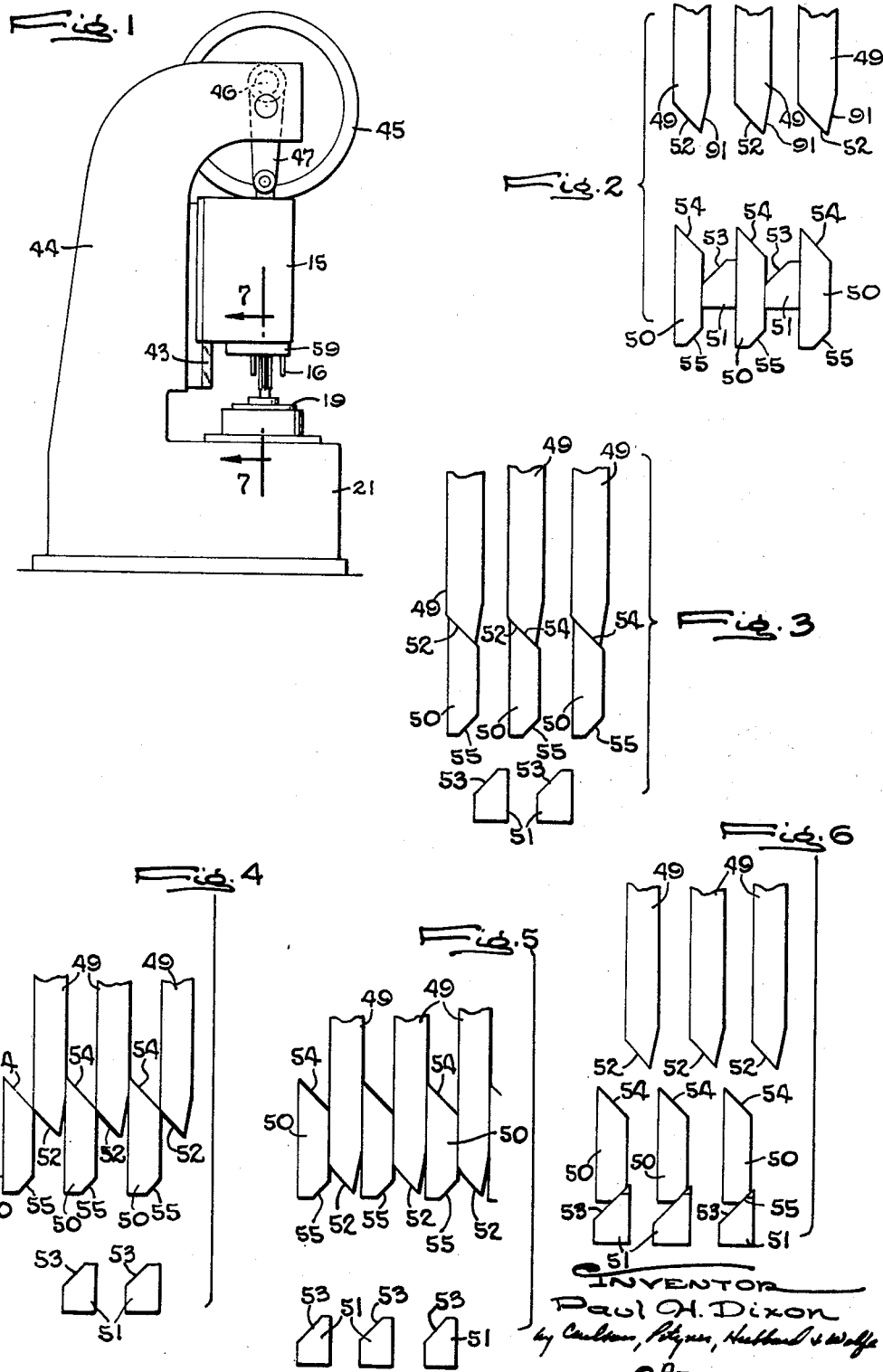
INVENTOR
Paul H. Dixon
by Carlton, Bilger, Hubbard & Wolf
ATTORNEY

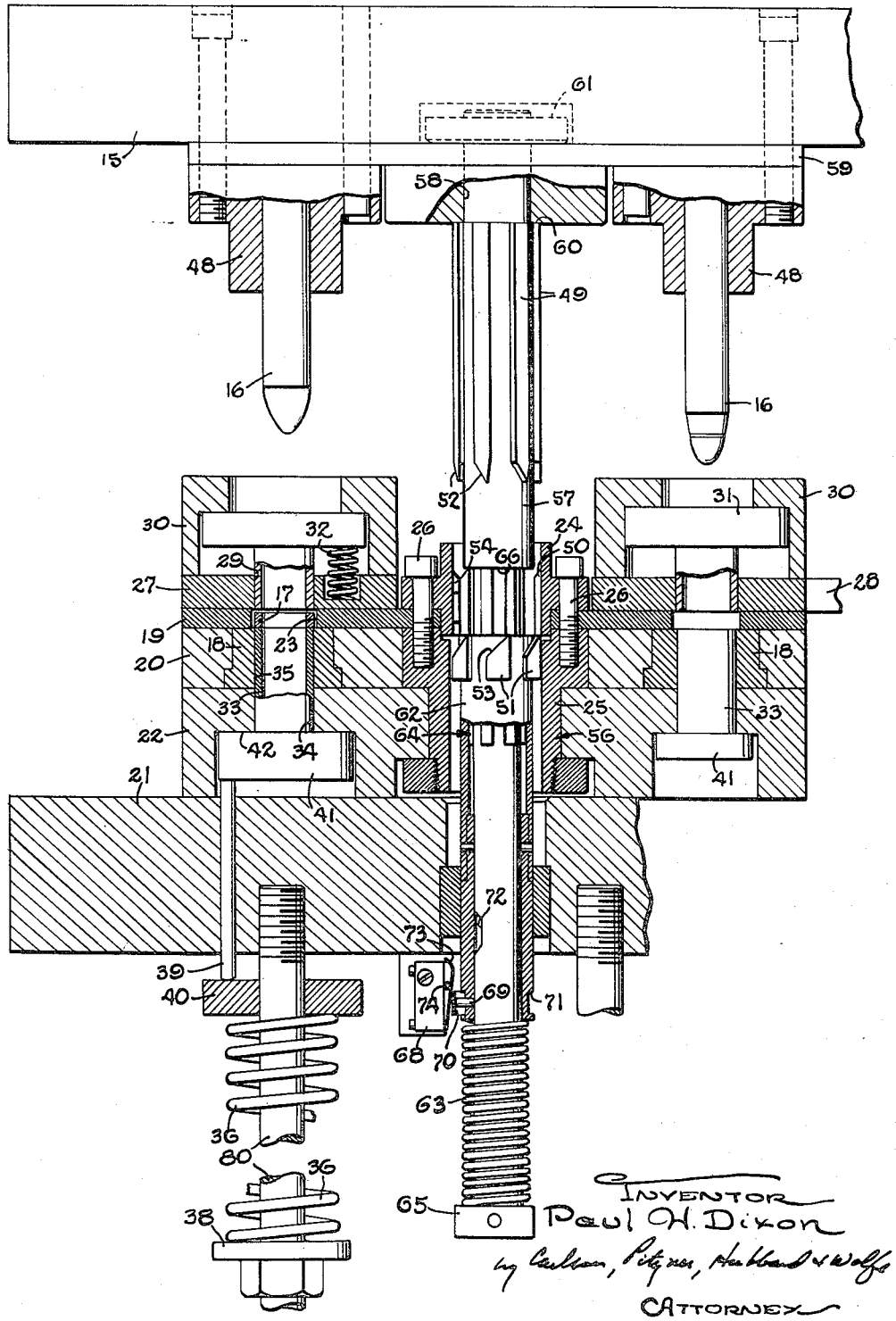

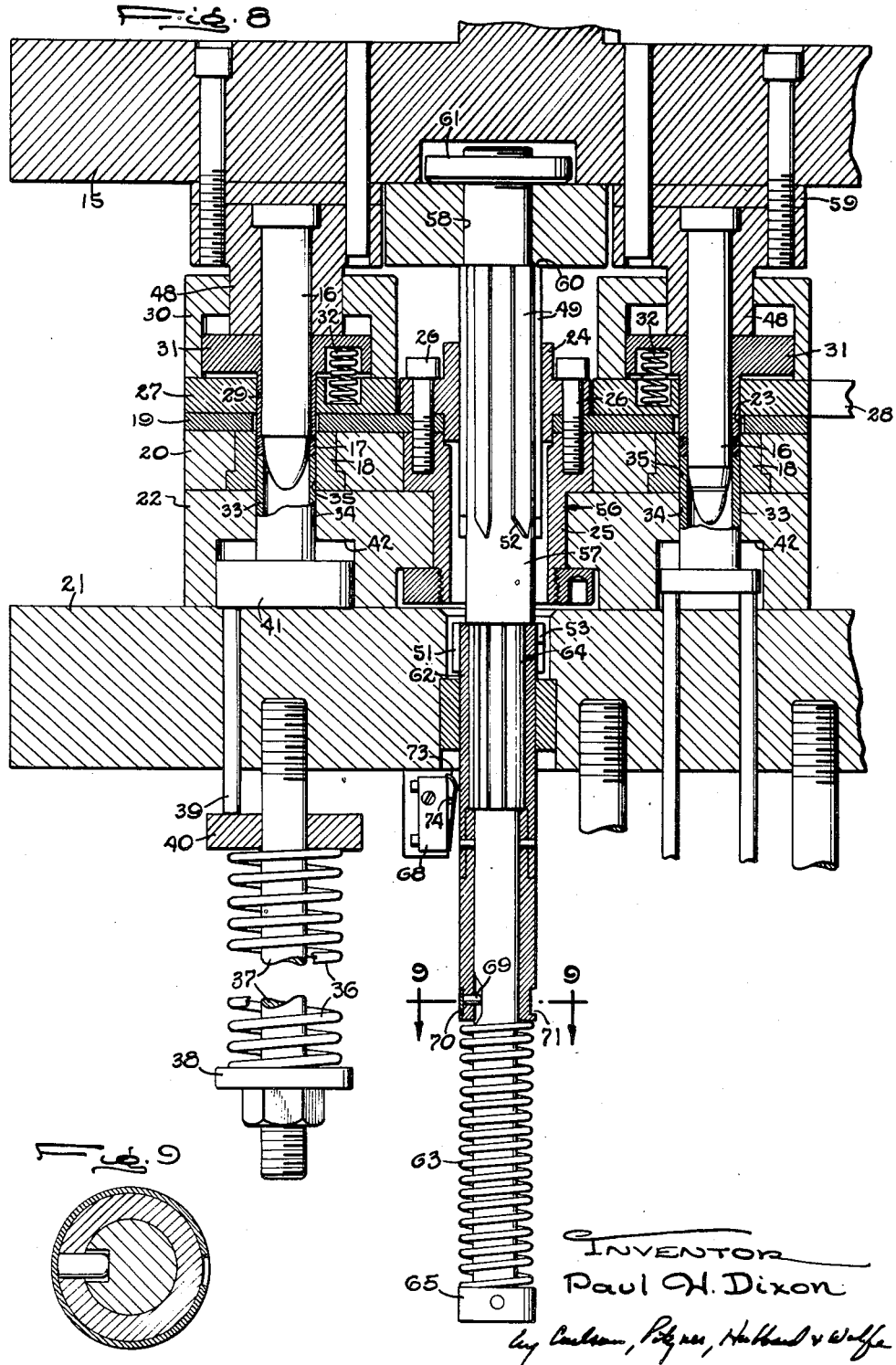

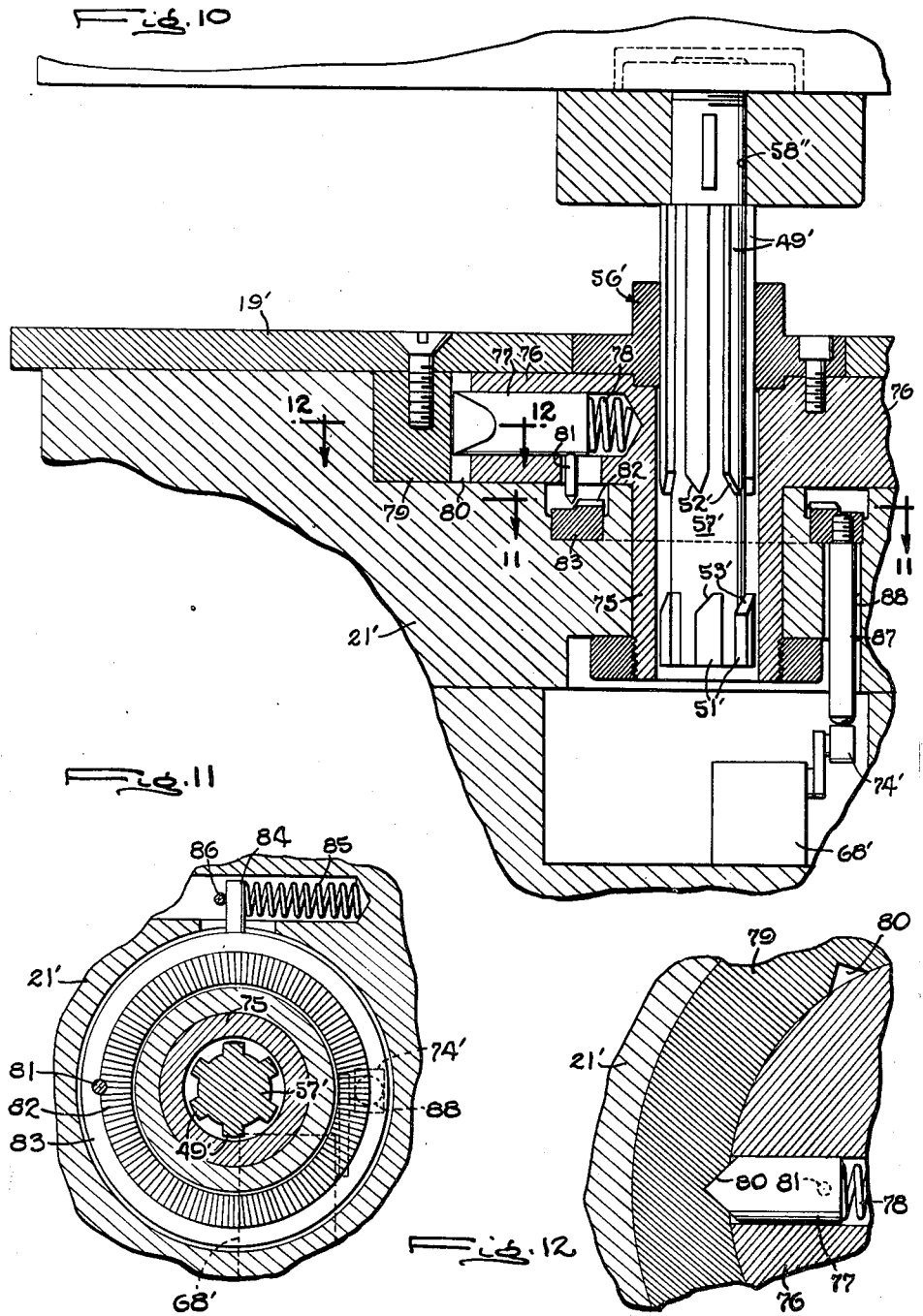

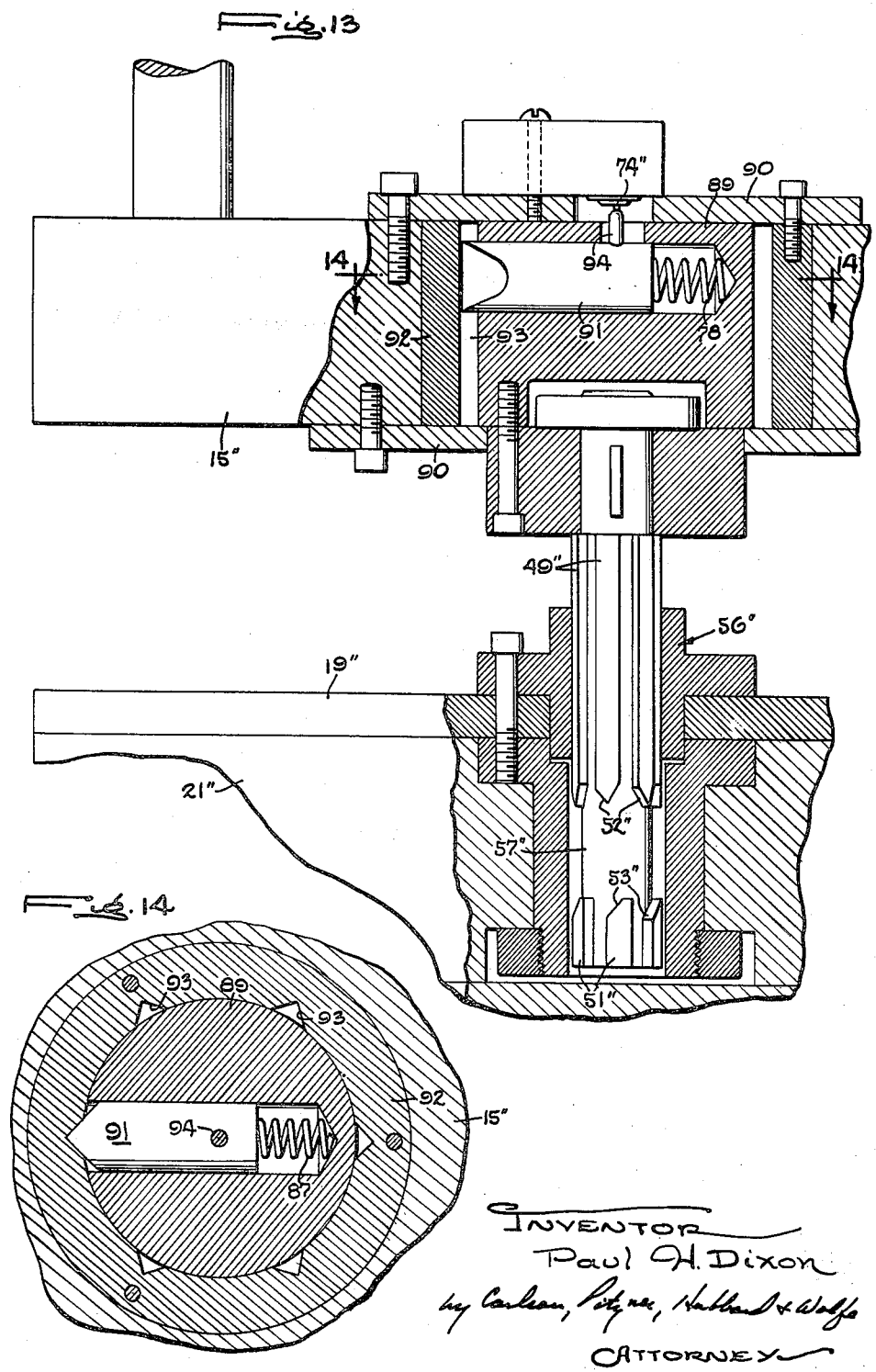

United States Patent Office 2,941,424
Patented June 21, 1960

2,941,424
INDEXING MECHANISM
Paul H. Dixon, Rockford, Ill., assignor to Dixon Research, Inc., Rockford, Ill., a corporation of Illinois
Filed Apr. 1, 1958, Ser. No. 725,696
11 Claims. (Cl. 74—814)

This invention relates generally to a mechanism for turning a rotary member through predetermined angular distances as an incident to relative reciprocation of the member and another member along the axis of turning. More particularly, the invention relates to indexing mechanism utilizing sets of teeth carried by the members and providing cam and follower surfaces which coact to turn the rotary members through a part of the predetermined distance during relative reciprocation of the members in one direction and through the remainder of the distance during relative reciprocation in the opposite direction.

The general object of the invention is to construct an indexing mechanism of the above character in a novel manner to prevent damage to the parts in case the rotary member accidentally is jammed against turning.

Another object is to mount the teeth on one member in a novel manner permitting continued relative reciprocation of the members without damage to the parts even though the rotary member cannot turn.

A more detailed object is to mount one set of teeth on its supporting member through a connection which normally holds the teeth against movement relative to the member so as to effect the indexing but which yields to permit the relative reciprocation to continue when the rotary member is jammed.

Other objects and advantages of the invention will become apparent from the following detailed description taken in connection with the accompanying drawings, in which Figure 1 is a side elevation of a punch press embodying the novel indexing mechanism of the present invention.

Figs. 2, 3, 4, 5 and 6 are schematic views illustrating the successive positions of the cam and follower surfaces during one indexing step.

Fig. 7 is a vertical sectional view taken on the lines 7—7 of Fig. 1.

Fig. 8 is a sectional view similar to Fig. 7 but showing the parts in a different position.

Fig. 9 is a sectional view taken along the line 9—9 of Fig. 8.

Fig. 10 is a vertical section of a modified form of the invention.

Fig. 11 is a horizontal sectional view taken on the lines 11—11 of Fig. 10.

Fig. 12 is a horizontal sectional view taken on the lines 12—12 of Fig. 10.

Fig. 13 is a vertical sectional view similar to Fig. 10 of another modification.

Fig. 14 is a horizontal sectional view taken on the lines 14—14 of Fig. 13.

The invention is shown in Figs. 1 to 9 of the drawings for purposes of illustration embodied in a punch press comprising a reciprocating head 15 carrying a plurality of punches 16 angularly spaced equal distances around the axis of the head to punch workpieces 17 (Fig. 7).

The workpieces are held in stationary dies or holders 18 during the punching operation and are advanced from one holder to the next by a turret 19. The holders 18 are alined axially with the respective punches and, in the present instance, are pressed into place in a plate 20 secured to the base 21 of the machine through the medium of an annular block 22. The turret 19 comprises an annular plate formed with a plurality of angularly spaced holes 23, one for each holder, which receive the workpieces for advance angularly to positions of alinement with the different holders. Supporting the turret plate for rotation are two coaxial tubular parts 24 and 25 which are clamped by screws 26 against opposite sides of the turret and are journaled in the base plate 20 and block 22 to turn about the axis of the annular series of punches.

Floating on top of the turret 19 is an annular guide plate 27 held against turning by a stationary member 28 and having holes 29 alined with the holders 18. Hollow guides 30 secured to and upstanding from the plate 27 around the holes 29 are open at their upper end and slidably receive tubular plungers 31 which normally are urged upwardly by compression springs 32 to keep the lower ends of the plungers above the bottom of the guide plate 27. When the plungers are depressed, their lower ends project into the holes 23 in the turret so that the workpieces are pushed down into the holders 18 as shown in Fig. 8 where it is supported from underneath by an ejector 33. The latter is similar in construction to the plunger 31 and is in the form of a tube projecting up through a hole 34 in the block 22 and into the bore 35 of the holder.

Normally, the ejector 33 is held up with its upper end flush with the top of the plate 20 so that it holds the workpiece 17 in the hole 23 in the turret 19 preparatory to indexing. However, the ejector is yieldably urged toward its upper position and slides down upon depression of the plunger 31 to permit the workpiece to enter the holder 18. For this purpose, a compression spring 36, coiled about a bolt 37, threaded into the base, acts between the ejector and a stationary abutment 38 on the bolt through a vertical rod 39 and a washer 40 sliding on the bolt. Upward movement of the ejector is limited by a flange 41 abutting an internal shoulder 42 on the block 22.

The head 15 slides on vertical ways 43 formed on a column 44 upstanding from the base 21 and is reciprocated by a flywheel 45 journaled on the upper end of the column and having an eccentric pin 46 connected to the head through a rod 47, the flywheel being driven by a suitable motor (not shown). The punches 16 are secured to the head through the medium of blocks providing bosses 48 (Figs. 7 and 8) encircling the punches and entering the hollow guides 30 to hold the floating plate 27 in fixed relation to the punches as the head is lowered. Upon entering the guides, the bosses 48 enter the guides 30 and depress the plungers 31 to push the workpieces 17 down into the holders 18 with a resultant downward sliding of the ejectors 33. During this downward movement, the punches 16 engage and form the workpieces as shown in Fig. 8. When the head is raised, the plungers 31 slide back up under the action of the springs 32 while the springs 36 push the ejectors up. This returns the workpieces to the holes 23 in the turret 19 preparatory to the next indexing step.

As an incident to reciprocation of the head 15, the turret 19 is indexed angularly through a distance corresponding to the spacing of the punches 16 to present each workpiece 17 successively to the different holders 18 and punches. This is accomplished by a plurality of teeth 49, 50 and 51 arranged on the head and turret in sets and providing cam surfaces 52 and 53 and follower surfaces 54 and 55 some of which coact to turn the turret through a part of the angular distance to bring the workpiece into axial alinement with the holders during the downward stroke of the head. On the return stroke, the other surfaces 53 and 55 turn the turret through the remainder of the distance and thereby condition the first surfaces 52 and 54 for engagement with each other to turn the turret through another part of the distance on the next downward stroke.

In the present instance, the indexing teeth are formed as splines on the interior of a sleeve 56 formed by the tubular mounting members 24 and 25 for the turret 19 and on the exterior of a shaft 57 depending rigidly from the head. The upper end portion of the shaft is reduced to project through a central hole 58 of a mounting plate 59 rigid with the head and the resulting shoulder 60 is drawn against the plate by a nut 61 threaded on the upper end of the shaft. The teeth 49 of one set are of substantial length and extend from the shoulder 60 down to a point spaced above the sleeve 56 when the head 15 is raised (Fig. 7). On the lower ends of these teeth are the cam surfaces 52 which are inclined upwardly in the direction of rotation of the turret 19 (to the left in Fig. 4) at an angle of 45 degrees. The mating spline teeth 50 of another set are formed internally on the sleeve 56 along the bore thereof with the follower surfaces 54 on the upper ends of these teeth inclined in the same direction and at the same angle as the cam surfaces 52 so that the two sets of surfaces are complemental.

On the lower ends of the internal spline teeth 50 is the second set of follower surfaces 55. The latter also are inclined at a 45 degree angle but in the direction opposite to the inclination of the follower surfaces 54, that is, downwardly in the direction of rotation of the turret 19. Coacting with the follower surfaces 55 are the cam surfaces 53 which are formed on the upper ends of the third set of spline teeth 51 on the exterior of the lower end portion of the shaft 57. The cam surfaces 53 face the follower surfaces 55 and are complemental to the latter. As shown in Figs. 7 and 8, the teeth 51 are quite short, being only a fraction of the length of the teeth 49, and are circumferentially offset from the latter so that the teeth 51 are axially alined with the grooves between the teeth 49. The teeth 51 are equally spaced around the axis of the shaft 57 as are the teeth 49 and 50 and the number of teeth in each set is equal to the number of stations on the turret, herein six.

With the foregoing arrangement, the cam and follower surfaces 52 and 54 turn the turret 19 to aline the workpieces 17 with the punches 16 as the head 15 is lowered while, on the upward stroke of the head, the cam and follower surfaces 53 and 55 turn the turret in the same direction so that the first sets of surfaces again are alined for active engagement on the next downward stroke of the head. Thus, when the head is in the raised position, the spline teeth 51 are in the grooves between the teeth 50 while the latter are alined with the teeth 49 as shown in Fig. 2. As the head starts down, the teeth 51 pass out from between the teeth 50 freeing the turret for rotation and the cam surfaces 52 come into full engagement with the follower surfaces 54 (Fig. 3). Upon continued downward movement of the head, the surfaces 52 and 54 turn the turret (to the left in Fig. 4) until the teeth 49 enter the grooves between the teeth 50 as shown in Fig. 4.

With the spline teeth 49 and 50 mating as illustrated in Fig. 5, the workpieces 17 are directly under the punches 16 and the turret 19 is held against rotation during the continued downward movement of the head. During this continued movement, the spline teeth 49 slide between the teeth 50 and the punches engage the workpieces and cut the desired holes in the latter.

As shown in Figs. 4 and 5, turning of the turret 19 by engagement of the cam and follower surfaces 52 and 54 brings the spline teeth 50 into alinement with the teeth 51 on the lower end of the shaft 57. As a result, the cam surfaces 53 on the teeth 51 engage the follower surfaces 55 on the lower ends of the teeth 50 when the head 15 and the shaft are raised upon completion of the punching operation. Such engagement (see Fig. 6) turns the turret in the same direction as did the cam and follower surfaces 57 and 54 so that the teeth 49 again are alined with the teeth 50 and the parts assume the position shown in Fig. 2 but with the turret advanced one full step. In other words, the cam and follower surfaces 53 and 55 index the turret through a half step to bring the surfaces 52 and 54 into position for active engagement while the latter surfaces complete the indexing and advance the turret to the punching position.

Occasionally, one of the ejectors 33 may fail to return the corresponding workpiece 17 completely into the hole 23 in the turret 19 in which case the workpiece prevents the turret from turning and jams the indexing mechanism. To preclude the possibility of damage to the parts of the machine under this or similar conditions, the present invention contemplates a novel arrangement of the spline teeth 49, 50 and 51 permitting continued movement of the head 15 without turning the turret when the latter is blocked. To this end, the teeth of at least one of the sets are yieldably connected to their supporting part, either the head or the turret, so as normally to move with such part to effect the turret indexing, but also, to shift relative to the one part when the turret is jammed against turning. Preferably, the resulting relative movement between the teeth and the supporting part is utilized to provide a signal indicating that the turret is jammed.

In the construction shown in Figs. 1 to 9, the teeth 51 on the lower end portion of the shaft 57 are mounted to yield upon jamming of the turret 19 during the upward stroke of the head 15, the teeth 49 and 50 of the other sets being rigid with the shaft and the turret respectively. Such yielding is obtained by forming the teeth 51 on an elongated sleeve 62 encircling the intermediate portion of the shaft for axial shifting relative to the latter against the action of a compression spring 63. The teeth 51 are disposed at the upper end of the sleeve 62 and the latter is splined to the shaft 57 as indicated at 64 to permit relative axial shifting while preventing the two parts from turning relative to each other. The lower end of the shaft projects beyond the end of the sleeve and the spring 63 encircles the projecting portion of the shaft and acts between the lower end of the sleeve and an enlarged head 65 on the end of the shaft.

The spring 63 normally holds the upper end of the sleeve 67 against a shoulder 66 on the shaft 57 as shown in Fig. 8 and its strength is such that it holds the sleeve and the shaft together as the cam surfaces 53 on the teeth 51 engage the follower surfaces 55 to index the turret the first half step. Thus, under normal operating conditions, the shaft and the sleeve are, in effect, unitary. When, however, a workpiece 17 is jammed, the spring yields after the cam surfaces 53 engage the follower surfaces 55 and permits the shaft to continue its upward movement while the sleeve and the turret remain stationary.

When a workpiece 17 is jammed, the turret 19 may be turned slightly by the cam and follower surfaces 53 and 55 before the spring 63 yields. In such a case, a portion of the follower surfaces 54 are under the upper spline teeth 49 on the shaft 57. Thus, if the head 15 and hence the shaft should be permitted to move down after jamming of the turret, the cam and follower surfaces 52 and 54 would tend to turn the turret even though the latter is jammed. To prevent this, the back edges of the teeth 49 are snubbed to give the lower ends of the teeth a general V shape and provide auxiliary cam surfaces 67 which are inclined in the opposite direction from the cam surfaces 52 and which engage the teeth 50 on the sleeve 56 and turn the turret back to the position in which it jammed.

To signal a jamming condition, relative movement between the sleeve 56 and the shaft 57 is utilized to close a switch 68. The latter is mounted on the base 21 under the block 22 alongside the sleeve. At a point on the sleeve which is opposite the switch when the cam surfaces 53 first engage the follower surfaces 55 a small pin 69 projects through the sleeve (see Figs. 8 and 9) and is held in place by a spring band 70 wrapped around the sleeve and over the pin and disposed in a peripheral groove 71 in the sleeve. Normally the inner end of the pin 69 projects into a notch 72 in the side of the shaft 57 so that the spring 70 is flush with the outside of the sleeve. Upon relative movement of the sleeve and the shaft due to jamming, the pin rides out of the notch as illustrated in Fig. 7. This shifts the spring 70, which is opposite the switch 68 at this time, radially against a leaf spring 73. The latter is mounted on the switch housing over the actuator 74 of the switch and depresses the actuator to close the switch when engaged by the spring band 70. The switch may be used to provide a visual signal or may disable the punch press through suitable control circuits well known in the art.

As shown in Figs. 10 to 12, the yieldable connection also may be located between the turret 19' and the sleeve 56' providing the set of internal teeth, the parts of this modification which correspond to parts in Figs. 1 to 9 bearing the same but primed reference characters. The yield in the modification is angular rather than axial and is obtained by securing the sleeve 56' to a tubular member 75 journaled on the base 21' and having an outturned flange 76. Supported in the latter for radial sliding movement is a bolt 77 which is urged by a spring 78 outwardly with respect to the flange and into engagement with the inner periphery of a ring 79 secured to the turret 19' and journaled therewith on the base.

The tapered outer end of the bolt 77 normally projects into one of a plurality of inwardly opening and angularly spaced recesses 80 on the ring 79 to turn the latter and the turret 19' with the spline sleeve 56', the number of recesses equalling the number of indexing stations. When the turret is jammed against turning, however, the cam and follower surfaces turn the ring relative to the turret and the bolt is cammed inwardly with respect to the flange to carry a depending pin 81 on the bolt into engagement with upwardly facing teeth 82 on an annular switch actuating member 83. This member is journaled on the base 21' and carries a radially projecting arm 84 which is urged by a spring 85 against a fixed stop 86 on the base to hold the member yieldably in an inactive position when the pin is out of engagement with the teeth 82. In such position, a rod 87 depending from the member and through a hole 88 in the base engages the actuator 74' of a switch 68'. When the bolt shifts inwardly to carry the pin 81 into engagement with the teeth and the spline sleeve continues to turn relative to the turret, the ring 83 is turned to carry the rod 88 out of engagement with the switch actuator 74' and thereby actuate the switch to provide the signal that the turret is jammed.

Whereas the yieldable connection of Figs. 1 to 9 provides protection only when the turret 19 became jammed during the upward stroke of the head 15, the modification of Figs. 10 to 12 permits continued movement of the head in both directions. A similar action is obtained in the further modification shown in Figs. 13 and 14 where the parts corresponding to those of the other forms bear the same reference characters with double primes. In this modification, both sets of teeth 49" and 51" on the head 15" are yieldable in respect thereto. To this end, these teeth are rigid with the shaft 57" and the latter is secured to a cylindrical block 89 journaled in the head to turn about the turret axis but secured against movement axially relative to the head by plates 90. The yieldable driving connection between this block and the head is similar to that of Figs. 10 to 12 and comprises a radially slidable bolt 91 spring urged outwardly against the inner periphery of a ring 92 which is secured to the head and is formed with angularly spaced recesses 93 receiving the bolt.

When the turret 19" is free to turn on the base 21" and thus indexes normally during reciprocation of the head 15", the bolt 91 projects into one of the recesses 93 to hold the spline shaft 57" against turning relative to the head. In this position of the bolt, a pin 94 thereon engages the actuator 74" of a switch 68". Should the turret become jammed, engagement of the follower surfaces on the sleeve 56" by the cam surfaces 52" or 53" will result in turning of the shaft relative to the head thereby permitting the latter to continue in whichever direction it is traveling. Such turning also is accompanied by inward shifting of the bolt 91 and movement of the switch pin 94 out of engagement with the switch actuator 74" to provide the signal that the turret is jammed.

I claim as my invention:

1. An indexing mechanism having, in combination, a rotary member mounted to turn about a predetermined axis and having a hole therethrough coaxial with the member, a reciprocating member projected through said hole to move back and forth along said axis and comprising first and second axially alined parts, a spring acting between said parts and urging the parts into axial abutting engagement while permitting relative axial movement between the two, a first set of inclined cam and follower surfaces on said first part and said rotary member respectively and engageable during the forward stroke of said reciprocating member to turn said rotary member to a predetermined angular position, a second set of inclined cam and follower surfaces formed respectively on said second part and said rotary member and cooperating when said two parts are in abutting engagement and upon the return stroke of said reciprocating member to turn said rotary member and thereby condition said first surfaces for active engagement on the next forward stroke of the reciprocating member, an element operatively connected to both of said parts and shiftable to an active position upon relative axial movement of the two parts, and means responsive to said element when in said active position to produce a signal.

2. An indexing mechanism comprising a roatry member mounted to turn about a predetermined axis, a reciprocating member mounted to move back and forth along said axis, first and second parts rigidly mounted on said rotary member and said reciprocating member respectively, first and second sets of follower surfaces formed on said first part, a first set of cam surfaces formed on said second part and engaging said first follower surfaces during the forward stroke of said reciprocating member to turn said rotary member to a predetermined angular position, a third part, yieldable means connecting said third part to said reciprocating member and operable normally to cause the part to move with the member but permitting relative movement between the two, a second set of cam surfaces on said third part engaging said second follower surfaces on the return stroke of said reciprocating member and operable when said third part moves with the reciprocating member to turn said rotary member thereby to condition said first surfaces for active engagement on the next forward stroke of the reciprocating member, and means responsive to relative movement between said third part and said reciprocating member and operable upon such relative movement to produce a signal.

3. An indexing mechanism comprising a rotary member mounted to turn about a predetermined axis, a reciprocating member mounted to move back and forth along said axis, a first set of follower surfaces formed on said rotary member, generally V-shaped cams rigid with said reciprocating member and each having a first cam surface along one side of the V and an auxiliary cam surface along the other side, said first cam and follower surfaces engaging each other on the forward stroke of said reciprocating member and cooperating to turn said rotary member to a predetermined angular position, a part yieldably mounted on said reciprocating member normally to move with the latter and having a second set of cam surfaces, and a second set of follower surfaces on said rotary member engaged by said second cam surfaces on the return stroke of said reciprocating member to turn said member away from said position and condition said first surfaces for active engagement on the next forward stroke of the reciprocating member, said part remaining stationary after engagement with said second surfaces upon jamming of said rotary member and said auxiliary cam surfaces engaging said first follower surfaces and turning said rotary member back to said position on the next forward stroke following such jamming.

4. An indexing mechanism having, in combination, a rotary member mounted to turn about a predetermined axis and having a hole therethrough coaxial with the member, a reciprocating member projected through said hole to move back and forth along said axis and comprising first and second alined parts, a spring acting between said parts and urging the parts into axial abutting engagement while permitting relative axial movement between the two, a first set of inclined cam and follower surfaces on said first part and said rotary member respectively and engageable during the forward stroke of said reciprocating member to turn said rotary member to a predetermined angular position, and a second set of inclined cam and follower surfaces formed respectively on said second part and said rotary member and cooperating when said two parts are in abutting engagement and upon the return stroke of said reciprocating member to turn said member and thereby condition said first surfaces for active engagement on the next forward stroke of the shaft.

5. An indexing mechanism comprising a rotary member mounted to turn about a predetermined axis, a reciprocating member mounted to move back and forth along said axis, first and second parts rigidly mounted on said rotary member and said reciprocating member respectively, first and second sets of follower surfaces formed on said first part, a first set of cam surfaces formed on said second part and engaging said first follower surfaces during the forward stroke of said reciprocating member to turn said rotary member to a predetermined angular position, a third part, yieldable means connecting said third part to said reciprocating member and operable normally to cause the part to move with the member but permitting relative movement between the two, and a second set of cam surfaces on said third part engaging said second follower surfaces on the return stroke of said reciprocating member and operable when said third part moves with the reciprocating member to turn said rotary member thereby to condition said first surfaces for active engagement on the next forward stroke of the reciprocating member.

6. Mechanism for utilizing relative reciprocating motion between two parts to effect angular step by step indexing of one of the parts about an axis, said mechanism comprising, in combination, means supporting said parts for said relative reciprocating motion longitudinally of said axis and supporting said one part for rotation about the axis, a plurality of teeth mounted on said parts in sets and having cam and follower surfaces coacting to index said one part as an incident to said relative reciprocating motion of the parts, and a yieldable connection joining the teeth of one of said sets and the supporting part therefor and operable normally to hold the teeth against movement relative to the part to enable said coacting cam and follower surfaces to index said one part, said connection yielding so that said teeth of said one set may shift relative to said supporting part and said relative reciprocating motion of the parts may continue in the event said indexing motion of said one part is obstructed.

7. An indexing mechanism comprising a rotary part mounted to turn about a predetermined axis, a second part mounted to reciprocate along said axis, a third part mounted on one of said rotary and second parts and normally movable with such part, cam and follower surfaces formed on said parts and coacting, during reciprocation of said second part and when said third part moves with said one of said rotary and second parts, to effect an indexing movement of the rotary part, and yieldable means connecting said third part and said one part and operable normally to cause the third part to move with the one part while yielding so that the third part may shift relative to the one part and thereby avoid interference with continued reciprocating motion of said second part in the event that said indexing movement of the rotary part is obstructed.

8. The indexing mechanism defined in claim 7 in which said third part is mounted on said rotary part for rotation relative thereto about said axis and said yieldable means includes a spring pressed detent member shiftable to actuate a signal producing means as an incident to relative rotation of the rotary and third parts.

9. The indexing mechanism defined in claim 7 in which said third part is mounted on and rotates relative to said second part about said axis and said yieldable means comprises a spring pressed detent member operable to actuate a signal producing means as an incident to relative rotation of the second and third parts.

10. An indexing mechanism comprising a rotary member mounted to turn about a predetermined axis, a reciprocating member mounted to move back and forth along said axis, a first part mounted on said rotary member, first and second sets of follower surfaces formed on said first part, a second part rigidly secured to said reciprocating member, a first set of cam surfaces formed on said second part and engaging said first follower surfaces during the forward stroke of said reciprocating member to turn said rotary member to a predetermined angular position, a second set of cam surfaces on said second part engaging said second follower surfaces on the return stroke of said reciprocating member and operable to turn said rotary member thereby to condition said first surfaces for active engagement on the next forward stroke of the reciprocating member, and yieldable means connecting said first part and said rotary member and operable normally to cause the part to move with the member but permitting relative movement between the two in the event rotation of the rotary member is obstructed.

11. An indexing mechanism comprising a rotary member mounted to turn about a predetermined axis, a reciprocating member mounted to move back and forth along said axis, a first part rigidly mounted on said rotary member, first and second sets of follower surfaces formed on said first part, a second part mounted on said reciprocating member for rotation relative thereto about said axis, a first set of cam surfaces formed on said second part and engaging said first follower surfaces during the forward stroke of said reciprocating member and when said second part is held against movement relative to the reciprocating member to turn said rotary member to a predetermined angular position, a second set of cam surfaces on said second part engaging said second follower surfaces on the return stroke of said reciprocating member and operable when the part is held against movement relative to the reciprocating member to turn said rotary member thereby to condition said first surfaces for active engagement on the next forward stroke of the reciprocating member, and yieldable means connecting said second part and said reciprocating member and operable normally to cause the part to move with the member but permitting relative movement between the two in the event rotation of said rotary member is obstructed.

References Cited in the file of this patent

UNITED STATES PATENTS

| | | |
|---|---|---|
| 95,586 | Henderson | Oct. 5, 1869 |
| 2,034,878 | Podel | Mar. 24, 1936 |
| 2,556,010 | Swanson | June 5, 1951 |